United States Patent
Gibbons

(10) Patent No.: US 11,196,750 B2
(45) Date of Patent: Dec. 7, 2021

(54) FINE-GRAINED DATA MASKING ACCORDING TO CLASSIFICATIONS OF SENSITIVE DATA

(71) Applicant: INTERNATIONAL BUSINESS MACHINES CORPORATION, Armonk, NY (US)

(72) Inventor: Stephen A. Gibbons, Beaumont Hills (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 265 days.

(21) Appl. No.: 16/515,622

(22) Filed: Jul. 18, 2019

(65) Prior Publication Data

US 2021/0021603 A1 Jan. 21, 2021

(51) Int. Cl.
*H04L 29/06* (2006.01)
*G06F 16/22* (2019.01)

(52) U.S. Cl.
CPC .......... *H04L 63/102* (2013.01); *G06F 16/221* (2019.01); *H04L 63/0428* (2013.01); *H04L 63/06* (2013.01); *H04L 63/08* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 7,917,770 B2* | 3/2011 | Gopinath | ............ | G06F 11/3672 713/189 |
| 7,978,929 B2* | 7/2011 | Kim | ................. | H04N 21/41415 382/284 |
| 8,422,668 B1* | 4/2013 | Thichina | ............. | G06F 21/6209 380/28 |
| 8,707,058 B1* | 4/2014 | Bain | .................... | G06F 21/6245 713/193 |
| 8,909,646 B1 | 12/2014 | Fabrikant | | |
| 9,122,880 B2* | 9/2015 | Arya | ....................... | G06F 21/60 |
| 2014/0122987 A1 | 5/2014 | Eigner | | |
| 2019/0228183 A1* | 7/2019 | Choi | ................... | G06F 21/6254 |
| 2020/0143082 A1* | 5/2020 | Dubishar | ............. | H04W 12/02 |
| 2020/0301917 A1* | 9/2020 | Niu | ...................... | G06F 16/2282 |
| 2021/0036995 A1* | 2/2021 | Guo | .................... | G06F 21/6245 |

FOREIGN PATENT DOCUMENTS

WO 2014179926 A1 11/2014

* cited by examiner

*Primary Examiner* — Amare F Tabor
(74) *Attorney, Agent, or Firm* — Cantor Colburn LLP; Joseph Petrokaitis

(57) ABSTRACT

A method includes receiving a request from a user account to access a base table via a smart table view. The base table includes sensitive columns and non-sensitive columns. Each record in the base table is associated with a respective protection key of a plurality of protection keys. Each protection key represents protection types of a plurality of protection types of sensitive data. The user account is associated with a user protection key. The user protection key represents at least one protection type for which the user account is authorized. The smart table view of the base table is dynamically generated by joining the base table and a custom mask table including a subset of the plurality of protection keys. The smart table view masks the non-sensitive columns of the base table in records of the base table having sensitive data the user account is not authorized to access.

17 Claims, 5 Drawing Sheets

| TABLE M1: COMPLETE MASK TABLE | | | |
|---|---|---|---|
| PI MASK | PI MASK (BINARY) | DESCRIPTION (SAMPLE) | SEC_LABEL (SAMPLE) |
| 0 | 00000 | (NO PROTECTION) | :: |
| 1 | 00001 | US FEDERAL PI | :PIUSF: |
| 2 | 00010 | EM PI | :PIEM: |
| 3 | 00011 | US FEDERAL PI AND EM PI | :PIUSF,PITW: |
| 4 | 00100 | TAIWAN PI | :PITW: |
| 5 | 00101 | US FEDERAL PI AND TAIWAN PI | :PIUS,PITW: |
| 6 | 00110 | EM PI AND TAIWAN PI | :PIEM,PITW: |
| 7 | 00111 | US FEDERAL PI AND EM PI AND TAIWAN PI | :PIUS,PIEM,PITW: |
| 8 | 01000 | CANADA PI | :PICA: |
| 9 | 01001 | CANADA PI AND US FEDERAL PI | :PICA,PIUSF: |
| 10 | 01010 | CANADA PI AND EM PI | :PICA,PIEM: |
| 11 | 01011 | CANADA PI AND US FEDERAL PI AND EM PI | :PICA,PIUSF,PIEM: |
| 12 | 01100 | CANADA PI AND TAIWAN PI | :PICA,PITW: |
| 13 | 01101 | CANADA PI AND US FEDERAL PI AND TAIWAN PI | :PICA,PIUSF,PITW: |
| 14 | 01110 | CANADA PI AND EM PI AND TAIWAN PI | :PICA,PIEM,PITW: |
| 15 | 01111 | CANADA PI AND US FEDERAL PI AND EM PI AND TAIWAN PI | :PICA,PIUSF,PEM,PITW: |
| 16 | 10000 | OTHER CC PI (FUTURE) | :PLCC: |

FIG. 2

FINE-GRAINED DATA MASKING ACCORDING TO CLASSIFICATIONS OF SENSITIVE DATA

BACKGROUND

The present invention relates to data warehousing and, more specifically, to fine-grained data protection according to classifications of sensitive data.

Increasingly, specific countries, geographic regions, business entities, and government entities around the world are introducing requirements for stricter data privacy compliance controls to prevent free and open access to personal information (PI), especially within data warehouses. To comply with these requirements, personal information such as customer or client names, addresses, phone numbers, email addresses, and social security numbers must be restricted or masked from unauthorized users. Access to this PI data can be allowed only to smaller groups of authorized individuals who have a justifiable business need for the access.

SUMMARY

In one or more example embodiments, a method includes receiving, using a computer processor, a request from a user account to access a base table via a smart table view. The base table includes one or more sensitive columns including sensitive data and one or more non-sensitive columns including non-sensitive data. Each record in the base table is associated with a respective protection key of a plurality of protection keys. Each protection key represents one or more protection types of a plurality of protection types of sensitive data. The user account is associated with a user protection key of the plurality of protection keys. The user protection key represents at least one protection type for which the user account is authorized. The smart table view of the base table is dynamically generated, by the computer processor, by joining the base table and a custom mask table including a subset of the plurality of protection keys. The smart table view masks the one or more non-sensitive columns of the base table in records of the base table having sensitive data the user account is not authorized to access.

In one or more other exemplary embodiments, a system includes a memory having computer-readable instructions and one or more processors for executing the computer-readable instructions. The instructions include receiving, using a computer processor, a request from a user account to access a base table via a smart table view. The base table includes one or more sensitive columns including sensitive data and one or more non-sensitive columns including non-sensitive data. Each record in the base table is associated with a respective protection key of a plurality of protection keys. Each protection key represents one or more protection types of a plurality of protection types of sensitive data. The user account is associated with a user protection key of the plurality of protection keys. The user protection key represents at least one protection type for which the user account is authorized. The smart table view of the base table is dynamically generated, by the computer processor, by joining the base table and a custom mask table including a subset of the plurality of protection keys. The smart table view masks the one or more non-sensitive columns of the base table in records of the base table having sensitive data the user account is not authorized to access.

In one or more other exemplary embodiments, a computer program product for masking sensitive data is disclosed. The computer program product includes a computer readable storage medium having program instructions embodied therewith. The program instructions executable by a processor to cause the processor to perform a method. The method includes receiving, using a computer processor, a request from a user account to access a base table via a smart table view. The base table includes one or more sensitive columns including sensitive data and one or more non-sensitive columns including non-sensitive data. Each record in the base table is associated with a respective protection key of a plurality of protection keys. Each protection key represents one or more protection types of a plurality of protection types of sensitive data. The user account is associated with a user protection key of the plurality of protection keys. The user protection key represents at least one protection type for which the user account is authorized. The smart table view of the base table is dynamically generated, by the computer processor, by joining the base table and a custom mask table including a subset of the plurality of protection keys. The smart table view masks the one or more non-sensitive columns of the base table in records of the base table having sensitive data the user account is not authorized to access.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 is an example mask table of the masking system, according to some embodiments of the invention;

Figure 1:
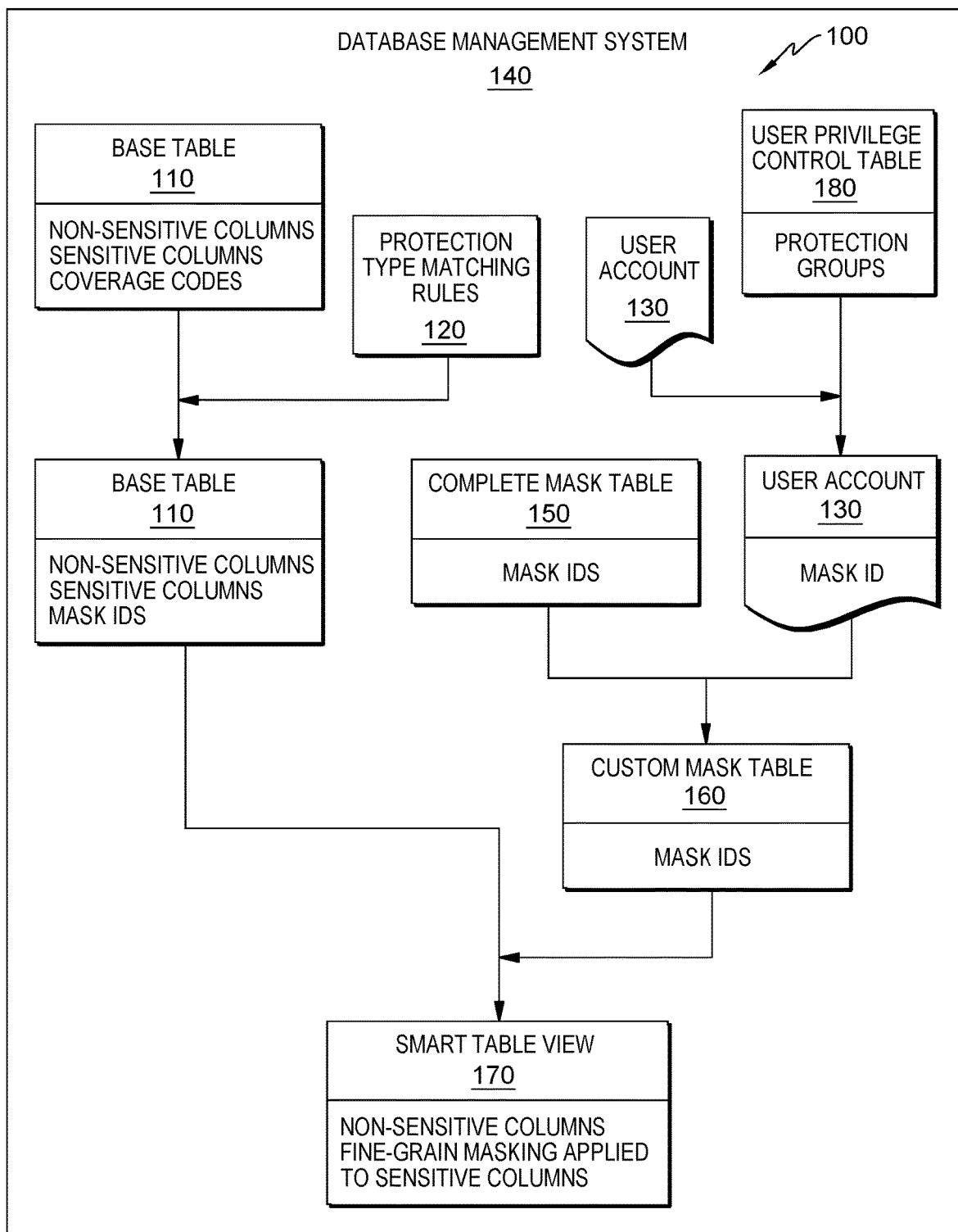
FIG. 1 is a block diagram of a masking system for masking sensitive data, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, some data warehousing platforms do not natively allow fine-grained masking of personal information. More specifically, there is no way to mask personal information contained within rows of database tables, such that only authorized users can view this data. This can expose corporations to risk of directly misusing PI or of exposing PI to data breaches. To address this potential issue, one option is to simply not maintain PI in database tables. However, in that case, business analytic warehouses cannot effectively maintain a rich set of information that is essential to authorized personnel who could benefit from having access to that PI. Another option is to maintain multiple database tables for the same data set. For instance, a first table may include both PI and non-PI data and may be accessible to only authorized personnel, while a second table that is accessible by all users is a filtered version of the first table, including only non-PI data. In other words, the tables include duplicate information, but only one of such tables additionally includes the PI. However, the maintenance of separate tables can be expensive in terms of computing resources.

Turning now to an overview of the aspects of the invention, one or more embodiments of the invention address the above-described shortcomings of the prior art by implementing a mechanism to precisely and efficiently mask data in specific columns based on user authorizations according to business conditions or other requirements. Embodiments of the invention enable sensitive data, such as personal information, to be securely stored in a data warehouse or elsewhere with the ability to restrict access according to one or multiple layers of protection control. More specifically, within a base table of a database management system (DBMS), each record may be assigned a mask ID that indicates applicable protection types for sensitive data in that record, where each protection type is a classification for sensitive data. Analogously, each user account may be assigned a combination of mask IDs indicating the protection types for which the user is authorized. By joining a base table with a mask table that specifies all mask IDs that fall within a user account's authorizations, embodiments of the invention produce a smart table view, which masks sensitive data for which the user account is not authorized.

The above-described aspects of embodiments of the invention address the shortcomings of the prior art by providing an improved mechanism to mask sensitive data from those who are not authorized, while displaying non-sensitive data to all users. Embodiments of the invention are efficient because only a single join operation is performed on demand to generate a smart table view with masked sensitive data, and no significant performance overhead is required. Additionally, if the mask IDs are numerical and if each mask ID can indicate a combination of protection types, as described herein, then verification of the condition for the join operation proceeds quickly. As such, embodiments of the invention provide an effective and efficient solution that improves upon existing mechanisms for masking sensitive data in data warehousing and other applications. Further, as requirements for PI and other sensitive data evolve, embodiments of the invention enable seamless incorporation or modification of protection types and, thus, enable masking according to new or changed requirements.

Turning now to a more detailed description of aspects of the present invention, FIG. 1 is a block diagram of the masking system 100 for masking sensitive data, according to some embodiments of the invention. The sensitive data may include personal information or other data deemed sensitive for its specific application. In some embodiments of the invention, the masking system 100 runs in a data warehouse, such as on the International Business Machines® Pure Data Appliance, also known as Netezza®, to mask PI data from unauthorized personnel. It will be understood, however, that embodiments of the invention can be used in various situations where the masking of PI data or other sensitive data is desirable.

As shown in FIG. 1, the masking system 100 may include, or apply to, one or more base tables 110, a set of protection type mapping rules 120, a user accounts 130 in a DBMS 140 to which the base tables 110 belong, a complete mask table 150, and a custom mask table 160 that can be dynamically filtered for each user account 130 based on the complete mask table 150 which only shows records (rows) relating to the permissions of the user account. In some embodiments of the invention, a base table 110 maintains various records (i.e., rows) including various columns, some of which may include sensitive data, such as PI. As will be described in detail below, the base table 110 may be updated based on the protection type mapping rules 120 to set a mask identifier (ID) column value associated with each record of the base table 110, where mask IDs indicate one or more types of sensitive data to be protected. In some embodiments of the invention, the complete mask table 150 defines each mask ID, and a custom mask table 160 for a user account 130 includes only the mask IDs applicable to a user of the user account 130. For each user, a smart table view 170 is a table view generated based on combining a base table 110 with the custom mask table 160 of the user, where the custom mask table 160 defines authorizations of the respective user account 130. Thus, the smart table view 170 has fine-grained masking of sensitive data for which a user account 150 is not authorized. As described in detail below, each user account 130 and associated user can access only data that is non-sensitive as well as sensitive data for which the user account 130 is authorized.

In some embodiments of the invention, sensitive data may be classified for various reasons based on, for example, business rules, laws, or other requirements. Additionally, for each class of sensitive data, some users and their associated user accounts 130 may be authorized to access that sensitive data while other users and associated user accounts 130 are not authorized. More specifically, there may exist in the DBMS 140 various protection types, each of which is associated with a protection group. A protection type is a class of sensitive data, and the corresponding protection group is the set of user accounts 130, and associated users, authorized to access that class of sensitive data. Generally, data belonging to any protection type is referred to herein as sensitive data, and user accounts 130 outside of a particular protection group are not authorized to view data classified as the respective protection type.

Protection types and corresponding protection groups may be defined based on requirements, such as laws, regulations, and business rules. For example, a protection group may be defined for regional PI authorization, in the case where only users in specific regions can view certain sensitive data associated with the region. More specifically, for instance, a regional protection group may be country-specific. For another example, a protection group may include users authorized by an organization to view sensitive data associated with that organization, and users outside that protection group are therefore not authorized to access the sensitive data of the organization. Users in that protection group may be, for instance, members of the organization or other users approved by the organization to view the organization's sensitive data. Custom groups may also be defined. For instance, a protection group of users may be permitted to see the Internet Protocol (IP) addresses of web visitors, while users outside the protection group are not permitted to see sensitive data of this type.

In some embodiments of the invention, a user privilege control table 180, as shown in FIG. 1, is loaded with a list of protection types, and the user privilege control table 180 may map each protection type to a set of user accounts 130 making up the respective protection group. In some embodiments of the invention, each protection group of the DBMS 140 is a Lightweight Directory Access Protocol (LDAP) group, and a DBMS category alias is defined for each protection group to enable assigning the protection groups to user accounts 130 of the DBMS 140.

Each protection type (PT) may be associated with a PT identifier, which may be a string, for instance. For example, for a protection type that covers United States federal data that is accessible only by United States residents, the PT identifier may be the string "USF," and organization-related data that is accessible only to users approved by the applicable organization may be associated with a PT identifier that is the string "ORG." Data may belong to zero, one, or multiple protection types, and sensitive data may belong to one or multiple protection types. Thus, a field of sensitive data may be associated with a security label, which may be a combination of the various PT identifiers of the applicable protection types. For instance, the security label may be a string that is a comma-delimited combination of all such PT identifiers. For instance, if a field of sensitive data belongs to the above example protection types, then the sensitive data may be associated with the security label "USF, ORG." In some embodiments of the invention, the PT identifiers may be arranged according to an established order, such as alphabetical order, to ensure matching of security labels that represent the same protection types.

Analogously, a user account 130, and thus the associated user, may belong to zero, one, or multiple protection groups. A user account 130 may therefore be associated with a security label, which may be a combination of the various PT identifiers of the protection types corresponding to the protection groups to which the user account 130 belongs.

In some embodiments of the invention, each protection type and corresponding protection group is associated with a mask ID, which is useable for masking purposes as described herein. In some embodiments of the invention, two or more mask IDs can be combined into a resulting mask ID, from which the mask IDs making up the resulting mask ID can be extracted in a deterministic manner. Thus, sensitive data belonging to multiple protection types may be assigned a mask ID that uniquely represents that combination of protection types. Analogously, a user account 130 belonging to multiple protection groups may be assigned a mask ID that uniquely represents that combination of protection groups.

To achieve this, in some embodiments of the invention, each mask ID is an integral data type, and each protection type and corresponding protection group corresponds to a respective bit in binary representation of that integral data type. If the respective bit is set (i.e., has a value of 1) for the mask ID associated with a field of sensitive data, then that sensitive data belongs to the protection type associated with that bit. Analogously, if the respective bit is set in the mask ID of a user account 130, then the corresponding user belongs to the protection group associated with that bit and is allowed to access sensitive data of the respective protection type.

Following is an example: Sensitive data that belongs to a first protection type, due to relation to US federal accounts, is assigned to the zeroth bit (i.e., the least significant bit) in binary representation. Thus, the mask ID of this first protection type is 1, which has a binary representation of 0001.

Sensitive data that belongs to a second protection type, due to relation to a European country, is assigned to the first bit (i.e., the second least significant digit). Thus, the mask ID of this second protection type is 2, which has a binary representation of 0010. Sensitive data that belongs to a third protection type, due to relation to Taiwan, is assigned to the second bit (i.e., the third least significant digit). Thus, the mask ID of this third protection type is 4, which has a binary representation of 0100. Sensitive data that belongs to a fourth protection type, due to relation to Canada, is assigned to the third bit (i.e., the fourth least significant digit). Thus, the mask ID of this fourth protection type is 8, which has a binary representation of 1000. For example, and not by way of limitation, sensitive data that relates both to a US federal account and to Canada would be assigned the mask ID of 9, which has a binary representation of 1001, in which both the zeroth bit and the third bit are set.

More generally, in some embodiments of the invention, when sensitive data belongs to multiple protection types, the mask IDs of the applicable protection types may be summed to produce the mask ID of the sensitive data. In some embodiments of the invention, the mask ID of sensitive data or of a user account 130 corresponds to the security label of the sensitive data or of the user account 130, as there is a one-to-one correspondence between mask IDs and security labels. Thus, it will be understood by one skilled in the art that mask IDs may be used in place of security labels in some embodiments of the invention.

As described in detail below, the mask IDs may be utilized to mask sensitive data on demand. To this end, the various mask IDs may be maintained in the complete mask table 150. FIG. 2 is an example complete mask table 150 of the masking system 100, according to some embodiments of the invention. In some embodiments of the invention, the complete mask table 150 includes a record for each possible mask ID, including mask IDs that result from combinations. Each possible mask ID may be represented by a corresponding record in the table. Thus, if there are M total protection types, these protection types can be combined in $2^M-1$ ways, and this there may be $2^M-1$ records in the complete mask table 150. Each record in the complete mask table 150 may include other information that may be useful to the masking system 100, to users, or to administrators, such as, for example, the security label or a description of the protection types combined into the mask ID.

In some embodiments of the invention, the complete mask table 150 has row-level security enabled, based on mask ID or based on security label. Each row in the complete mask table 150 may be associated with a protection key, which may be the mask ID or the security label, for instance, such that the protection key identifies the one or more protection types combined in the record. Each user account 130 may also include a protection key, which may be the applicable mask ID or security label. In some embodiments of the invention, the type of protection key (i.e., whether the mask ID or the security label) used in user accounts 130 is the same protection key used for row-level security of the complete mask table 150. In some embodiments of the invention, the protection key is used for row-level security of the complete mask table 150 and thus determines which records of the complete mask table 150 a user account 130 can access.

In some embodiments of the invention, a user account 130 can access only a sub-table of the complete mask table 150, where that sub-table is the respective user's custom mask table 160. Through application of the row-level protection, the user account 130 can access only records whose protection keys match the protection key of the user account 130. In some embodiments of the invention, the protection key of a record of the complete mask table 150 is deemed to match the mask ID of a user account 130 if the mask ID of the record is included in the mask ID of the user account 130. For instance, if the protection key is the mask ID, then if the set bits of the binary mask ID of the user include all the set bits of the binary mask ID of a record of the complete mask table 150, then that record of the complete mask table 150 is included in the user's custom mask table 160. Analogously, if the protection key is the security label, then if the PT identifiers in the security label of the user include all the PT identifiers in the security label of a record of the complete mask table 150, then that record is included in the custom mask table 160 for the user account 130. As will be described below, in some embodiments of the invention, the joining of a base table 110 to the custom mask table 160 of a user produces a smart table view 170 that masks sensitive data the user is not authorized to access.

Generally, the masking system 100 may include three stages. In a first stage, each user account 130 and associated user are assigned a respective protection key that defines sensitive data that the user account 130 is authorized to access. More specifically, the protection key indicates each protection group to which the user belongs. In some embodiments of the invention, the first stage is an initialization activity and need be performed only once or each time a change to user accounts 130 or protection groups is detected. In a second stage, each base table 110 may be modified, based on the protection type mapping rules 120, to include an applicable mask ID in each record. The mask ID of a record indicates which protection types are represented in the record and, thus, which protection groups can access the record. In some embodiments of the invention, this second stage is an initialization activity that need be performed only once per base table 110. In a third stage, which may be performed on demand each time a user account 130 attempts to access a base table, the base table 110 is combined (e.g., by way of a left join operation) with the custom mask table 160 of the user account 130 to produce a smart table view 170 that includes only the data the user account 130 is authorized to access. More specifically, the smart table view 170 may include all non-sensitive data of the base table 110 as well as all sensitive data for which the user account 130 is authorized, while other sensitive data is masked. It should be noted that the smart table view 170 may show every row in the base table 110. Only data values in sensitive data columns will be masked when the mask ID of the base table 110 does not match a mask ID in the custom mask table 160.

Figure 3:
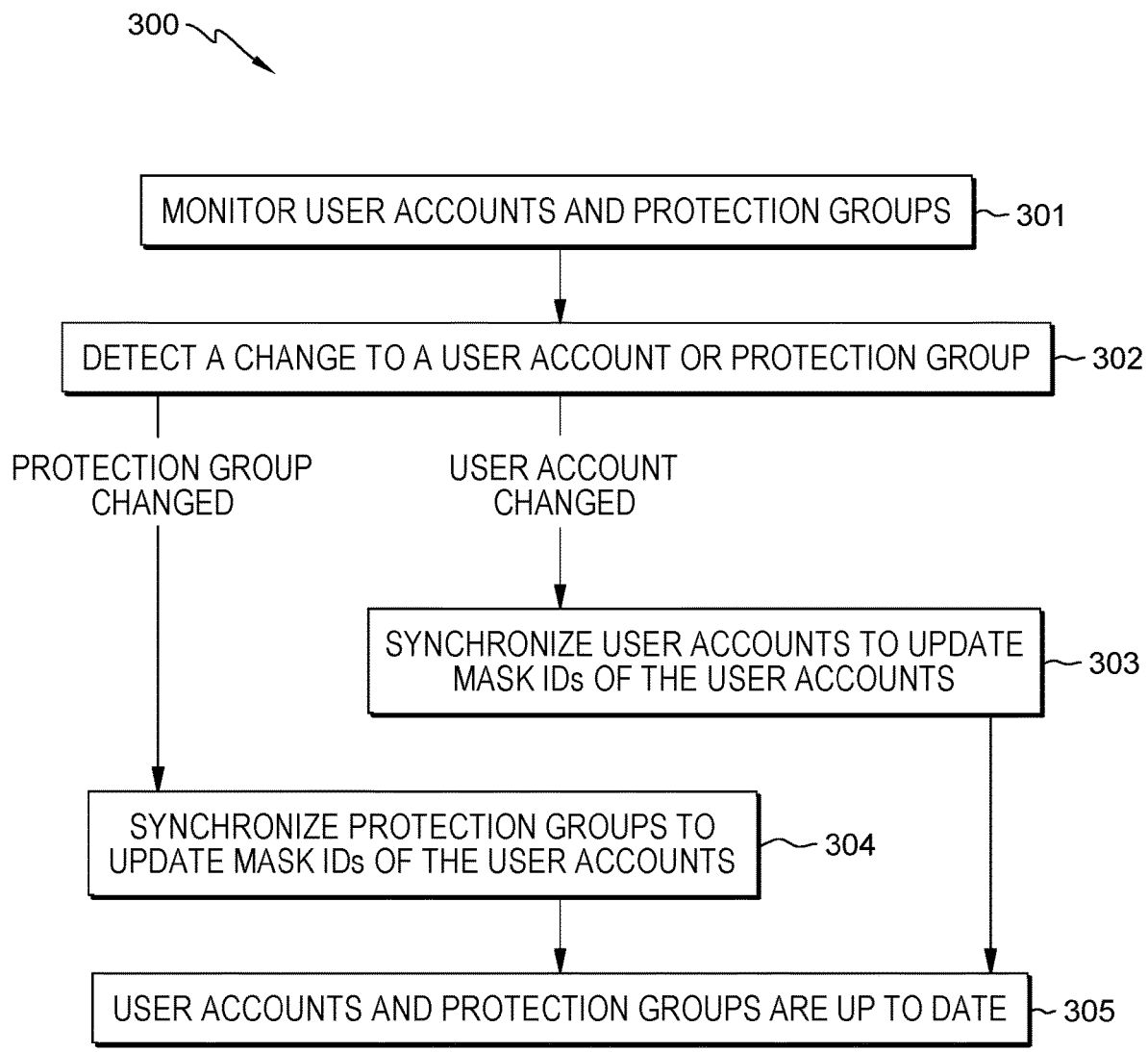
FIG. 3 is a flow diagram of a method of assigning a respective protection key to each user account, where a protection key indicates authorizations for sensitive data, according to some embodiments of this invention.

FIG. 3 is a flow diagram of a method 300 of assigning a respective protection key to each user account 130, and thus to each user, according to some embodiments of this invention. In other words, the method 300 of FIG. 3 relates to the first stage of the masking system 100. In some embodiments of the invention, prior to the method 300, the user privilege control table 180 is loaded with a list of protection groups relating to the available protection types. For instance, the user privilege control table 180 may include a record for each protection type, where that record indicates the various user accounts 130 in the corresponding protection group.

At the beginning of the method 300 of FIG. 3, there are an existing set of user accounts 130 for the DBMS 140, and an existing set of protection groups are defined in the user privilege control table 180. As shown in FIG. 3, at block 301, these user accounts 130 and protection groups are monitored for changes. At block 302, a change is made to one or more user accounts 130 or to one or more protection groups.

If the change is to one or more user accounts 130, then at block 303, the some or all user accounts 130 of the DBMS 140 are synchronized to update the protection keys of the user accounts 130. The synchronization may be performed because, generally, changes to user accounts 130 can result in the removal of user accounts 130 or the creation of new user accounts 130. In some embodiments of the invention, the synchronization may be performed by way of an Extract-Transform-Load (ETL) job designed to synchronize user accounts 130, and this ETL job is initiated automatically responsive to the change to a user account 130.

However, if the change is to one or more protection groups, then at block 304, the various protection groups may be synchronized. During synchronization, the protection key (e.g., the mask ID or the security label) associated with each user account 130 may be updated. To this end, for each user account 130, the set of applicable protection groups may be identified, and a new protection key may be generated based on the identities of those protection groups. For instance, this may be performed by way of an established ETL job that, for each user account 130, generates a respective protection key indicating the respective DBMS category aliases for all the protections groups to which the user account 130 belongs.

Thus, at block 305, the resulting user accounts 130 and protection groups may have been updated based on the change. In one embodiment, all data rows in the custom mask table 160 may have a similar pre-defined security label, which may contain, for example, a comma separated list of protection group alias labels that relate to the PI mask value. In this embodiment, in the custom mask table 160 only data rows will be displayed where all protection group alias labels of the security label exist in the users' security label. The comma separated list of protection group alias labels may be updated within the security label of each user account 130.

Figure 4:
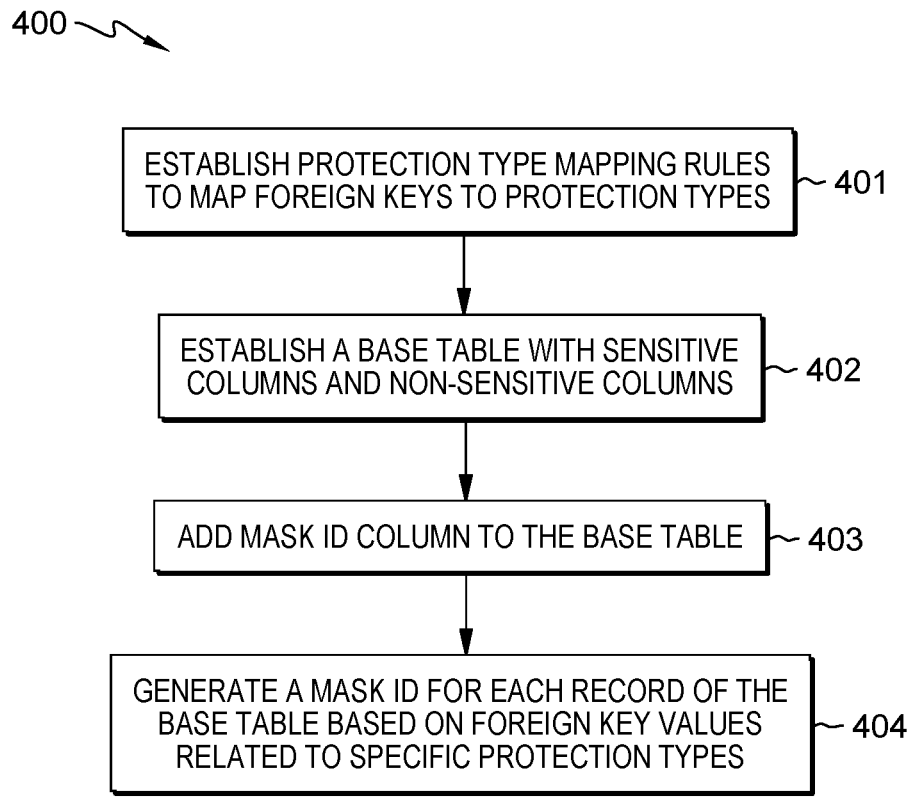
FIG. 4 is a flow diagram of a method of modifying a base table to include protection keys, according to some embodiments of the invention.

FIG. 4 is a flow diagram of a method 400 of modifying a base table 110 to include protection keys, such as mask IDs or security labels, according to some embodiments of the invention. This method 400 relates to the second stage of the masking system 100. In this disclosure, the protection key is assumed to be the mask ID, and thus the below description of this method 400 refers to adding mask IDs to a base table 110. It will be understood by one skilled in the art, however, that mask IDs may be replaced with security labels in the base table 110 and as a basis for row-level protection of the complete mask table 150.

As shown in FIG. 4, at block 401, a set of protection type mapping rules 120 are established and may be embodied in a mapping table. Generally, the protection type mapping rules 120 may map a protection type codes to foreign keys, such as a specific country code or federal organization coverage code. For instance, a record of information may be related to a protection type code linked to a country code and also another protection type relating to a coverage code that indicates the data is linked to a US Federal organization, by way of the protection type mapping rules 120, which may be corresponding to a regional protection type. As discussed above, each protection type corresponds to a protection group, and thus the mapping rules may therefore map each record related country code or coverage code to one or more protection groups, either explicitly or implicitly.

At block 402, a base table 110 may be established to include a plurality of records, to include both sensitive columns and non-sensitive columns, and to include a related country number and/or coverage code. It will be understood by one skilled in the art that the order of establishment of the mapping rules, at block 401, and the base table 110, at block 402, may vary between embodiments of the invention. Further, the remainder of this method 400 need not occur immediately after establishment of the protection type mapping rules 120 and the base table 110. Additionally, although only a single base table 110 is shown in FIG. 1 and described herein, it will be understood that the masking system 100 may be used for multiple base tables 110. In that case, this method 400 or an appropriate other method for modifying a base table 110 may be applied to each base table 110 sought to be protected through the masking system 100. More specifically, if multiple base tables 110 are being modified to include protection keys, then block 402 and the remaining blocks of this method 400 may be performed for each such base table, while block 401 need not be performed for each base table 110.

In some embodiments of the invention, the base table 110 includes one or more protection type foreign keys (e.g. country number or coverage code), which can be in metadata or in one or more fields of the base table 110. For example, and not by way of limitation, the base table 110 may include a column indicating one or more sources of the data in the associated record, and these sources may be used as a protection type linkage key. As another non-limiting example, the base table 110 may include a column indicating a country code, and that country code may be used as a mapping to a protection type associated with country-specific sensitive data. As yet another example, the base table 110 may include a column dedicated to coverage code, and records may include applicable coverage codes in that column. Coverage codes may be incorporated into the base table 110, such that each record is associated with zero or one coverage codes indicating applicable protection types for the record. In some embodiments of the invention, such coverage codes are provided in each record, or associated with each record, when that record is inserted into the base table 110 or when that record is modified with updated data. Alternatively, however, coverage codes may be added after the fact, although this may be a more manually intensive process.

At block 403, a mask ID column may be added to the base table 110. In some embodiments of the invention, this column may be initialized to a zero value (meaning no masking of the data record is required), but will be updated with a calculated non-zero mask IDs value when the data record contains foreign keys relating to one or more protection types.

At block 404, a mask ID may be generated for each record and inserted into the applicable mask ID column for the record in the base table 110 based on foreign key values related to specific protection types. To this end, for each record, the masking system 100 may determine a complete list of protection types applicable to the record based on the protection type mapping rules 120. For instance, for each country code or coverage code associated with the record (e.g., in the record or in the metadata of the record), the protection type corresponding to that country or coverage code according to the protection type mapping rules 120 may be deemed to apply to the record. From the complete list of protection types applicable to a record, the masking system 100 may determine a mask ID to indicate all such protection types. In some embodiments of the invention, an ETL job is used to determine the protection types of each record based on the protection type mapping rules 120 and to classify each record according to those protection types. It should be noted that the distinct integral values of each protection type key (1, 2, 4, 8, . . . ) may be intentionally pre-defined with binary values so that values for different protection types can be summed into a combined PI mask integral value representing a combination of PI type privileges required to view the unmasked data values. For example, if the data relates to a PI type relating to a north American Country code (PI type=1) and is also related to a coverage code relating to US Federal (PI type=2), then a combined PI Mask for both privileges can be calculated as 3 (i.e., 1+2).

Figure 5:
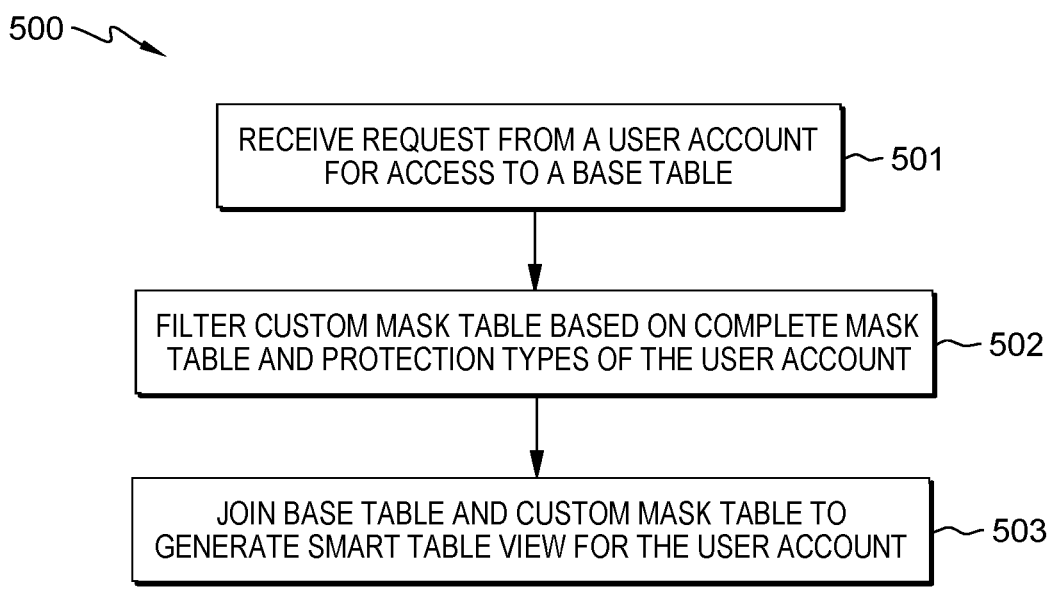
FIG. 5 is flow diagram of a method of generating a smart table view dynamically customized for a specific user account based on authorizations, according to some embodiments of the invention.

FIG. 5 is flow diagram of a method 500 of generating a smart table view 170 customized for a specific user account 130, according to some embodiments of the invention. This method 500 relates to the third stage of the masking system 100 and may be executed each time a user account 130 attempts to access a smart table view 170. This method 500 may present the user account 130, and thus the associated user, with a smart table view 170 that shows only data the user is authorized to view. In some embodiments of the invention, the smart table view 170 includes all data rows of the base table and shows unmasked data columns values for non-sensitive data columns, as well as all sensitive data values in data columns, but only for which the user is in the appropriate protection groups. As described below, the masking system 100 masks just the sensitive data column values for rows that the user is not authorized to access.

At block 501, the user may request access to the smart table view 170, such as by selecting the smart table view 170 for viewing. This request for access may be made through the user account 130 of the user.

At block 502, a custom mask table 160 may be dynamically filtered for the user account 130 based on the complete mask table and based on protection types of the user account. The custom mask table 160 may be a sub-table of the complete mask table 150 and may include only those records that correspond to mask IDs included in the mask ID of the user account 130. As described above, in some embodiments of the invention, the custom mask table 160 has row-level security enabled, and thus, data records in the custom mask table 160 are automatically filtered based on application of that row-level protection by comparing protection type security labels pre-defined on each record to the protection type security label of the user account 130. The resulting custom mask table 160 may include records (keyed by PI mask) of the complete mask table 150 that define combinations of protection types the user is authorized to access.

At block 503, the base table 110 may be joined with the custom mask table 160 to generate the smart table view 170, which is a table view showing all rows in the base table 110 with sensitive data masked unless the user belongs to the applicable protection groups. More specifically, in some embodiments of the invention, the base table 110 is combined with the custom mask table 160 in a left outer join operation, also referred to as a left join, based on the mask ID or other protection key. Generally, the result of a left outer join includes selected columns of the left table (i.e., the base table 110, in this case) and selected columns of the right table (i.e., the custom mask table 160, in this case), where values are only included in fields of the right table if a join condition is met. According to some embodiments of the invention, the left join operation is used such that the sensitive columns of the base table 110 are conditionally masked. Specifically, in some embodiments of the invention, the sensitive columns are selected for the left join operation but are replaced by the string "PROTECTED," or some other masking value, when a masking condition is not met.

In some embodiments of the invention, the masking condition differs from the traditional join condition, as the masking condition is used to determine whether the actual data in the base table 110 is shown or whether replacement data (e.g., "PROTECTED") is shown instead to mask the actual data. For instance, as shown in the example below, the masking condition applies to sensitive columns and asks whether the mask ID of a record is visible for the user in the custom mask table 160, and if not, the sensitive column value for that record is replaced. This masking condition may differ from the join condition, which determines whether to include data within a column selected from the custom mask table 160, and as shown in the below example, this is a moot determination in some embodiments of the invention as no columns need be selected from the custom mask table 160 during the left join.

The result is a smart table view 170 that incorporates dynamic masking of sensitive data in records for which the user is not authorized to view sensitive data. For records in which the user is authorized to view sensitive data, the smart table view 170 may include the sensitive data in the sensitive columns of those records. In some embodiments of the invention, the smart table view 170 displays all data values in non-sensitive columns of the base table 110, such that this non-sensitive data is available for analytics or other purposes regardless of the user's protection groups.

In one example of a left outer join operation executed to mask sensitive data for which the user account 130 is not authorized (i.e., not in the applicable related protection groups), Table A is the base table 110, Table CUSTOM_MASK_TABLE is the custom mask table 160 for the user account 130, and SMART_TABLE_VIEW is the smart table view 170 being generated with masked sensitive data. Further, in this example, the non-sensitive columns of Table A are MASK_ID, which is the column containing the mask IDs, and each column prefixed with "NS_." The sensitive columns of the base table 110 are the following: SEN_COL01, SEN_COL02, and SEN_COL03. Following is an example left outer join executed to preserve the data in all non-sensitive columns, while replacing with the string "PROTECTED" all data in sensitive columns of records for which the user is not authorized to access the full combination of protection types:

CREATE OR REPLACE VIEW SMART_TABLE_VIEW AS
SELECT
A.NS_COL01,
A.NS_COL02,
A.NS_COL03,
A.NS_COL04,
A.NS_COL05,
CASE WHEN (CUSTOM_MASK_TABLE.MASK_ID ISNULL) THEN 'PROTECTED'::"NVARCHAR" ELSE A.SEN_COL01 END AS SEN_COL01,
CASE WHEN (CUSTOM_MASK_TABLE.MASK_ID ISNULL) THEN 'PROTECTED'::"NVARCHAR" ELSE A.SEN_COL02 END AS SEN_COL02,
CASE WHEN (CUSTOM_MASK_TABLE.MASK_ID ISNULL) THEN 'PROTECTED'::"NVARCHAR" ELSE A.SEN_COL03 END AS SEN_COL03,
A.NS_COL06,
A.NS_COL07,
A.NS_COL08,

FROM
A
LEFT JOIN CUSTOM_MASK_TABLE ON A.MASK_ID=CUSTOM_MASK_TABLE.MASK_ID;

In the above example, the join condition is A.MASK_ID=CUSTOM_MASK_TABLE.MASK_ID. In other words, in the resulting smart table view 170, data from the custom mask table 160 is included in each column selected from the custom mask table 160 for each record of the base table 110 that has a mask ID found in the custom mask table 160. However, in this example, all the selected columns are from the base table 110, and there are no columns selected from the custom mask table 160. Thus, in some embodiments of this invention, as in this example, no column data of the custom mask table 160 is included in the smart table view 170. The masking condition is CUSTOM_MASK_TABLE.MASK_ID_ISNULL, which asks whether the mask ID of a record is found in the custom mask table 160. If the mask ID of a record is not found in the custom mask table 160, then the column data is replaced with "PROTECTED" in this example. In the above, the masking condition applies only to sensitive columns of this example. Thus, in some embodiments of the invention, as in this example, all other columns are selected from base table 110 and used as-is in the smart table view 170.

In some embodiments of the invention, performance for generating a smart table view 170 on demand, as described above, is good because only a single left join need be performed. It will be understood by one skilled in the art, however, that other combinations of join operations may be used to achieve the same or a similar result, and such combinations are within the scope of embodiments of this invention. In some embodiments of the invention, the protection groups of the user account 130 and the sensitivity or non-sensitivity of columns are known and need not be evaluated at the time the smart table view 170 is generated. Thus, in generating the smart table view 170, business rules need not be examined as such rules may already be incorporated into the protection groups and in indication of column sensitivity or non-sensitivity. Additionally, if the mask ID is integral, as described above, then verification of the join condition for the left join operation as well as the masking condition proceeds relatively quickly. Advantageously, integral (e.g., BIGINT) based key matching is much faster than other numeric data types. As such, generation of a smart table view 170 masking sensitive data for which the user is not authorized, as described herein, can be performed efficiently.

Figure 6:
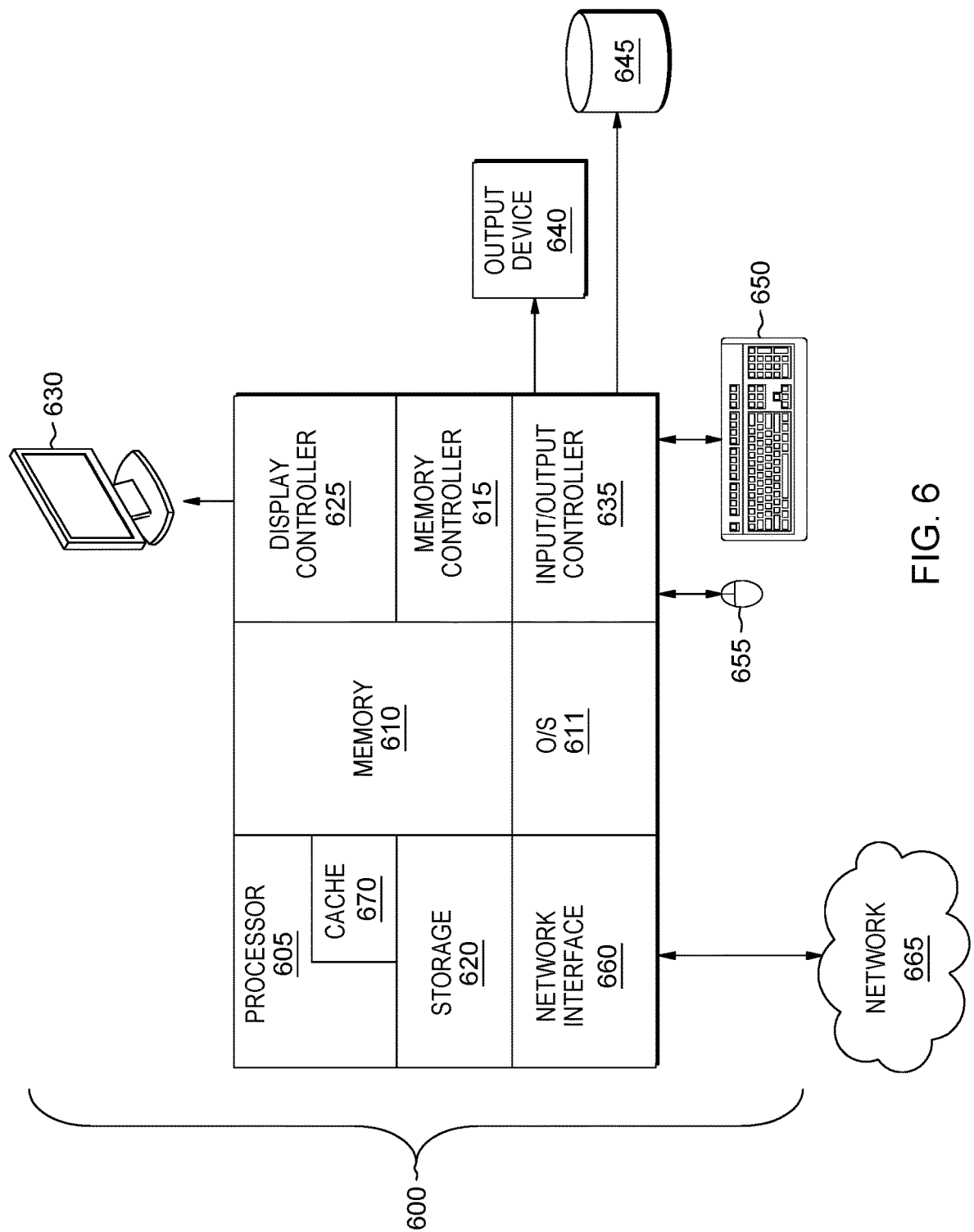
FIG. 6 is a block diagram of a computer system for implementing some or all aspects of the masking system, according to some embodiments of this invention.

FIG. 6 is a block diagram of a computer system 600 for implementing some or all aspects of the masking system 100, according to some embodiments of this invention. The masking systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For example, and not by way of limitation, the DBMS 140 may be incorporated into one or more computer system 600, and the generation of a smart table view 170 may be performed on such one or more computer systems 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635.

These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor-based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the masking systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Masking systems 100 and methods according to this disclosure may be embodied, in whole or in part, in computer program products or in computer systems 600, such as that illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, using a computer processor, a request from a user account to access a base table via a smart table view, wherein the base table comprises:
        one or more sensitive columns comprising sensitive data; and
        one or more non-sensitive columns comprising non-sensitive data;
    wherein each record in the base table is associated with a respective protection key of a plurality of protection keys, and wherein each protection key represents one or more protection types of a plurality of protection types of sensitive data;
    wherein the user account is associated with a user protection key of the plurality of protection keys, the user protection key representing at least one protection type for which the user account is authorized;
    dynamically generating, by the computer processor, the smart table view of the base table by joining the base table and a custom mask table comprising a subset of the plurality of protection keys, wherein the smart table view masks the one or more non-sensitive columns of the base table in records of the base table having sensitive data the user account is not authorized to access;
    identifying values of one or more related foreign keys that identify related protection types in a first record of the base table;
    mapping the values of the one or more related foreign keys of the first record to one or more protection types of sensitive data in the first record, based on a set of mapping rules;
    generating a first protection key based on the one or more protection types; and
    assigning the first protection key to the first record, responsive to identifying the one or more protection types in the first record.

2. The computer-implemented method of claim 1, further comprising dynamically filtering a custom mask table, wherein the dynamically filtering the custom mask table comprises:
    detecting the protection key associated with the user account; and
    filtering, from the custom mask table, each mask table record associated with each protection key that does not match the user protection key, wherein the custom mask table comprises records for each protection key of the plurality of protection keys relating to one or more user privileges.

3. The computer-implemented method of claim 1, wherein a first protection key of the plurality of protection keys represents one or more protection types of the plurality of protection types, and wherein the first protection key is deterministically divisible into the one or more protection types.

4. The computer-implemented method of claim 3, further comprising:
    assigning, to each protection type of the plurality of protection types, a respective bit in each protection key of the plurality of protection keys; and
    generating the first protection key by setting, in the first protection key, the respective bit of each protection type in the one or more protection types.

5. The computer-implemented method of claim 4, further comprising generating the user protection key associated with the user account, wherein generating the user protection key comprises:
    determining one or more protection types for which the user account is authorized; and
    setting, in the user protection key, the respective bit of each protection type for which the user account is authorized.

6. The computer-implemented method of claim 1, wherein the one or more protection types comprise two or more protection types, and wherein the two or more protection types are uniquely determinable from the first protection key.

7. A system comprising:
    a memory having computer-readable instructions; and
    one or more processors for executing the computer-readable instructions, the computer-readable instructions comprising instructions for:
        receiving, from a user account, a request to access a base table via a smart table view, wherein the base table comprises:
            one or more sensitive columns comprising sensitive data; and
            one or more non-sensitive columns comprising non-sensitive data;
            wherein each record of a plurality of records in the base table is associated with a respective protection key of a plurality of protection keys, and wherein each protection key represents one or more protection types of a plurality of protection types of sensitive data;
        wherein the user account is associated with a user protection key of the plurality of protection keys, the user protection key representing at least one protection type for which the user account is authorized;
        dynamically generating the smart table view of the base table by joining the base table and a custom mask table comprising a subset of the plurality of protection keys, wherein the smart table view masks the one or more non-sensitive columns of the base table in records of the base table having sensitive data the user account is not authorized to access;

identifying values of one or more related foreign keys that identify related protection types in a first record of the base table;

mapping the values of the one or more related foreign keys of the first record to one or more protection types of sensitive data in the first record, based on a set of mapping rules;

generating a first protection key based on the one or more protection types; and assigning the first protection key to the first record, responsive to identifying the one or more protection types in the first record.

8. The system of claim 7, wherein:

the computer-readable instructions further comprise instructions for dynamically filtering a custom mask table; and wherein the dynamically filtering the custom mask table comprises:

detecting the protection key associated with the user account; and filtering, from the custom mask table, each mask table record associated with each protection key that does not match the user protection key, wherein the custom mask table comprises records for each protection key of the plurality of protection keys relating to one or more users privileges.

9. The system of claim 7, wherein:

a first protection key of the plurality of protection keys represents one or more protection types of the plurality of protection types and wherein the first protection key is deterministically divisible into the one or more protection types.

10. The system of claim 9, wherein the computer-readable instructions further comprise instructions for:

assigning, to each protection type of the plurality of protection types, a respective bit in each protection key of the plurality of protection keys; and generating the first protection key by setting, in the first protection key, the respective bit of each protection type in the one or more protection types.

11. The system of claim 10, wherein:

the computer-readable instructions further comprising instructions for generating the user protection key associated with the user account; and the instructions for generating the user protection key further comprise instructions for:

determining one or more protection types for which the user account is authorized; and setting, in the user protection key, the respective bit of each protection type for which the user account is authorized.

12. The system of claim 7, wherein:

the one or more protection types comprise two or more protection types; and wherein the two or more protection types are uniquely determinable from the first protection key.

13. A computer-program product for masking sensitive data, the computer-program product comprising a computer-readable storage medium having program instructions embodied therewith, the program instructions executable by a processor to cause the processor to perform a method comprising:

receiving, from a user account, a request to access a base table via a smart table view, wherein the base table comprises:

one or more sensitive columns comprising sensitive data; and one or more non-sensitive columns comprising non-sensitive data;

wherein each record in the base table is associated with a respective protection key of a plurality of protection keys, and wherein each protection key represents one or more protection types of a plurality of protection types of sensitive data;

wherein the user account is associated with a user protection key of the plurality of protection keys, the user protection key representing at least one protection type for which the user account is authorized;

dynamically generating the smart table view of the base table by joining the base table and a custom mask table comprising a subset of the plurality of protection keys, wherein the smart table view masks the one or more non-sensitive columns of the base table in records of the base table having sensitive data the user account is not authorized to access;

identifying values of one or more related foreign keys that identify related protection types in a first record of the base table;

mapping the values of the one or more of the related foreign key values of the first record to one or more protection types of sensitive data in the first record, based on a set of mapping rules;

generating a first protection key based on the one or more protection types; and assigning the first protection key to the first record, responsive to identifying the one or more protection types in the first record.

14. The computer-program product of claim 13, wherein:

the method further comprises dynamically filtering a custom mask table, wherein the filtering the custom mask table comprises:

detecting the protection key associated with the user account; and filtering, from the custom mask table, each mask table record associated with each protection key that does not match the user protection key, wherein the custom mask table comprises records for each protection key of the plurality of protection keys relating to one or more user privileges.

15. The computer-program product of claim 13, wherein:

a first protection key of the plurality of protection keys represents one or more protection types of the plurality of protection types; and wherein the first protection key is deterministically divisible into the one or more protection types.

16. The computer-program product of claim 15, wherein the method further comprises:

assigning, to each protection type of the plurality of protection types, a respective bit in each protection key of the plurality of protection keys; and generating the first protection key by setting, in the first protection key, the respective bit of each protection type in the one or more protection types.

17. The computer-program product of claim 16, wherein:

the method further comprises generating the user protection key associated with the user account; and wherein generating the user protection key comprises:

determining one or more protection types for which the user account is authorized; and setting, in the user protection key, the respective bit of each protection type for which the user account is authorized.

* * * * *